Jan. 21, 1958    B. G. AINSWORTH    2,820,660
SCREW CONSTRUCTION
Filed Oct. 29, 1956
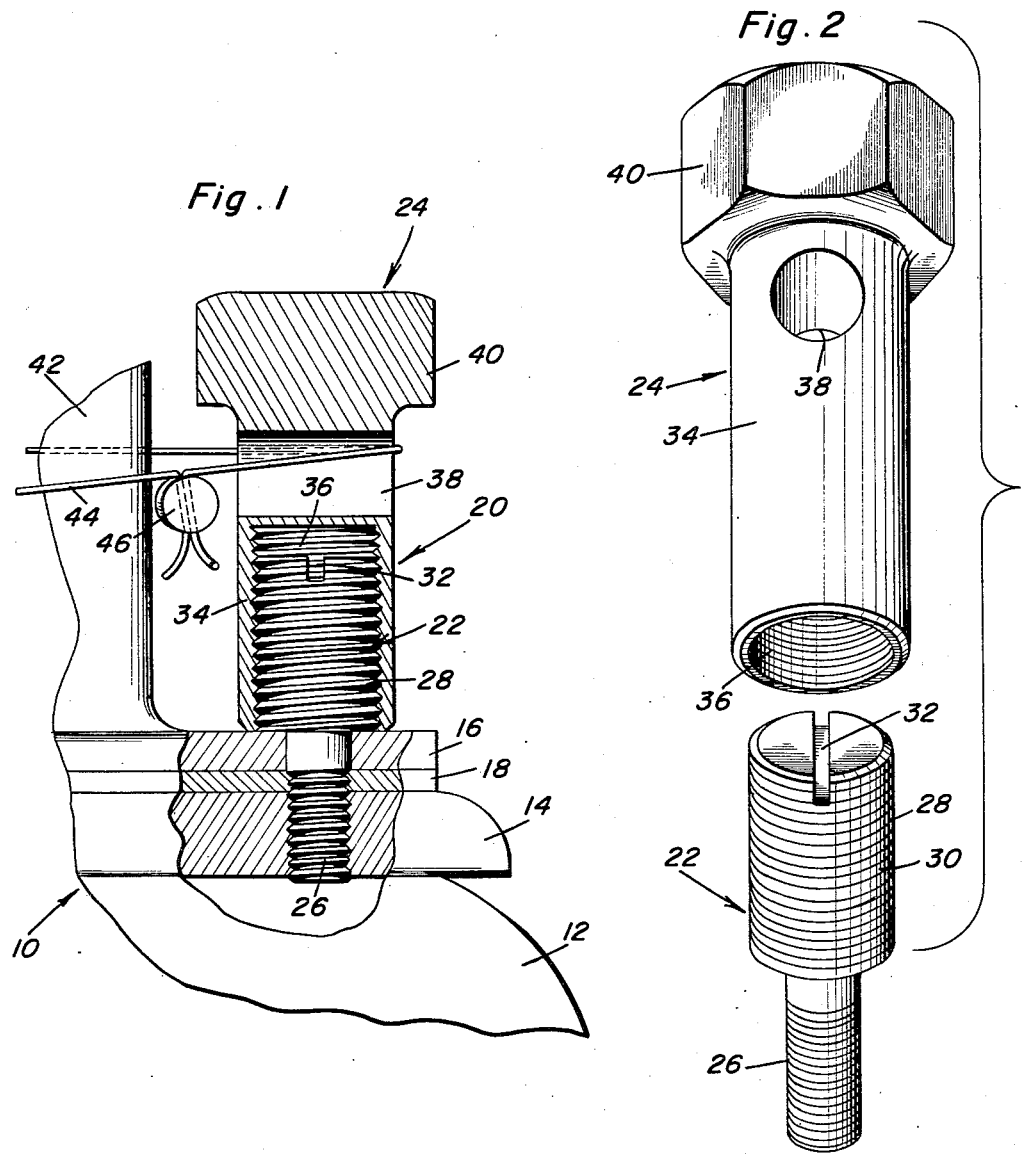
Burton G. Ainsworth
INVENTOR.

United States Patent Office 2,820,660
Patented Jan. 21, 1958

2,820,660

SCREW CONSTRUCTION

Burton G. Ainsworth, Bell Gardens, Calif.

Application October 29, 1956, Serial No. 618,995

3 Claims. (Cl. 292—327)

This invention relates in general to new and useful improvements in screw constructions, and more specifically to a screw construction which is used in conjunction with seals for meters and the like.

At the present time seals are used on all types of equipment including meters. The seals consist of a wire which is passed through at least one screw in each meter installation so that when the screw is removed it is necessary to break the wire thus indicating that the meter has been tampered with. However, in the normal installation it has been possible to back off the screw or other type of fastener a few turns without breaking the wire. This permits the covering for the turning mechanism for the meter to be disengaged without breaking the sealing wire. Since this is the whole purpose of the sealing wire and such purpose has been avoided, it will be readily apparent that other systems are more desirable.

It is therefore the primary object of this invention to provide a fastener seal construction which may be utilized in conjunction with a sealing wire and which is so constructed whereby it will be impossible to remove a securing part of the fastener without breaking the wire.

Another object of this invention is to provide a fastener seal construction which includes a two-part assembly, the first part being in the form of a fastener which serves the usual purpose of holding a cover plate or the like in place and a cap which is disposed over the head of the fastener for preventing the removal of the fastener until such time as the cap has been completely removed, the cap having a sealing wire opening for receiving a sealing wire to normally prevent its removal from the fastener.

A further object of this invention is to provide an improved fastener seal construction, the fastener seal construction including a fastener and a cap, the fastener having a lower threaded shank and a head, the head of the fastener being externally threaded and there being suitable tool engaging means on the head of the fastener, the cap including a threaded sleeve portion threadedly engaged over the head of the fastener and preventing access to the tool engaging portion of the fastener, the cap being provided with an opening for receiving a sealing wire so as to prevent the removal of the cap without indicating that the seal has been tampered with.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a fragmentary sectional view taken through a meter employing the fastener seal construction which is the subject of this invention and shows the general details of the fastener seal construction; and Figure 2 is an enlarged exploded perspective view of the fastener seal construction and shows further the details thereof.

Referring now to the drawings in detail, it will be seen that there is illustrated in Figure 1 a portion of a meter which is referred to in general by the reference numeral 10. The meter 10 includes a body portion 12 having an upper flange 14. Overlying the flange 14 is a cover 16 which is sealed to the flange 14 by means of a gasket 18. Securing the cover 16 to the flange 14 is a fastener seal construction which is referred to in general by the reference numeral 20.

The fastener seal construction 20 includes a fastener, which is referred to in general by the reference numeral 22, and a cap which is referred to in general by the reference numeral 24. The fastener 22 and the cap 24 cooperate as a unit.

The fastener 22 includes a lower externally threaded shank 26 and a head 28. The head 28 is provided with external threads 30 and the upper end thereof is provided with tool engaging means in the form of a screwdriver slot 32. It is to be understood that the fastener 22 will be applied in the same normal manner as other screws.

The cap 24 includes an elongated sleeve portion 34 which has internal threads 36. Passing through the upper part of the sleeve portion 34 is a wire receiving opening 38. The upper end of the cap 24 is in the form of a head 40 which is externally configurated to provide tool engaging means.

After the fastener 22 has been used to secure the cover 16 in place, the cap 24 is engaged thereover by threading the sleeve portion 34 down over the head 28. This relationship between the cap 24 and the fastener 22 is best illustrated in Figure 1.

It is to be understood that one or more of the fastener seal constructions 20 may be utilized in conjunction with the meter 10. Passed around an upper part of the meter 10, the upper part being referred to by the reference numeral 42, is a sealing wire 44 which passes through each opening 38. The ends of the sealing wire 44 are sealed together by a seal 46.

Since the cap 24 must be entirely removed from the fastener 22 before the fastener 22 may be removed, it will be readily apparent that there will be insufficient slack in the wire 44 to prevent the removal of the cap 24 without breaking either the wire 44 or its seal 46. Thus the fastener seal construction 20 prevents any tampering without the indication of such tampering.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fastener seal construction comprising a fastener and a cap, said fastener having a threaded shank and a head, said head having tool engaging means for facilitating the application and removal of said fastener, said cap being completely received over said head and rendering said tool engaging means inaccessible, a seal wire opening in said cap for preventing the removal of said cap without breaking a seal wire.

2. A fastener seal construction comprising a fastener and a cap, said fastener having a threaded shank and a head, said head having tool engaging means for facilitating the application and removal of said fastener, said head being externally threaded, said cap including a sleeve portion, said sleeve portion being internally threaded and threadedly engaged over said head, a seal wire opening in said cap for preventing rotation of said cap and removal of said cap from said fastener without breaking a seal wire.

3. A fastener seal construction comprising a fastener and a cap, said fastener having a threaded shank and a head, said head having tool engaging means for facilitating the application and removal of said fastener, said head being externally threaded, said cap including a sleeve portion, said sleeve portion being internally threaded and threadedly engaged over said head, a seal wire opening in said cap for preventing rotation of said cap and removal of said cap from said fastener without breaking a seal wire, a head on the upper end of said sleeve closing said sleeve, said last mentioned head including tool engaging means for facilitating the application and removal of said cap.

References Cited in the file of this patent

UNITED STATES PATENTS

| | | |
|---|---|---|
| 1,526,301 | Stevens | Feb. 10, 1925 |
| 1,974,274 | Hopkins | Sept. 18, 1934 |
| 2,020,522 | Seguin | Nov. 12, 1935 |
| 2,784,020 | Curry | Mar. 5, 1957 |